(12) United States Patent
Yamamoto et al.

(10) Patent No.: US 11,146,188 B2
(45) Date of Patent: Oct. 12, 2021

(54) MOTOR DRIVING CONTROL APPARATUS AND MOTOR DRIVING CONTROL METHOD

(71) Applicant: MINEBEA MITSUMI Inc., Nagano (JP)

(72) Inventors: Katsunori Yamamoto, Iwata (JP); Hiroyuki Kato, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/639,631

(22) PCT Filed: Jun. 12, 2018

(86) PCT No.: PCT/JP2018/022473
§ 371 (c)(1),
(2) Date: Feb. 17, 2020

(87) PCT Pub. No.: WO2019/039052
PCT Pub. Date: Feb. 28, 2019

(65) Prior Publication Data
US 2021/0126560 A1    Apr. 29, 2021

(30) Foreign Application Priority Data

Aug. 21, 2017   (JP) .............................. JP2017-158635

(51) Int. Cl.
*H02P 3/22*       (2006.01)
*H02P 6/24*       (2006.01)

(52) U.S. Cl.
CPC . *H02P 3/22* (2013.01); *H02P 6/24* (2013.01)

(58) Field of Classification Search
CPC .................... H02P 3/22; H02P 6/24
(Continued)

(56) References Cited

U.S. PATENT DOCUMENTS

| 4,514,677 A | 4/1985 | Kaufman, III et al. |
| 6,118,241 A * | 9/2000 | Kazlauskas ............... H02P 6/24 |
| | | 318/299 |

(Continued)

FOREIGN PATENT DOCUMENTS

| JP | H01-133583 A | 5/1989 |
| JP | H01-209973 A | 8/1989 |

(Continued)

OTHER PUBLICATIONS

International Search Report dated Aug. 7, 2018 for corresponding International Application No. PCT/JP2018/022473.

(Continued)

*Primary Examiner* — David Luo
(74) *Attorney, Agent, or Firm* — Pearne & Gordon LLP (57) ABSTRACT

A motor driving control apparatus according to an embodiment includes: a motor driving unit that selectively energizes three-phase coils of a motor; a motor control unit that switches an energizing phase of the coils, the energizing phase being a phase to which the motor driving unit energizes, in a predetermined order by outputting a driving control signal to the motor driving unit; a brake control unit that outputs a brake control signal; an interphase short-circuiting unit that is connected between two-phase coils of the three-phase coils, and that short-circuits the two-phase coil in response to a short-circuiting signal; and a short-circuiting signal output unit that is connected between the interphase short-circuiting unit and one-phase coil that is not different from each of the two-phase coils of the three-phase coils, and that outputs a short-circuiting signal to the interphase short-circuiting unit when the brake control signal is received.

15 Claims, 9 Drawing Sheets

(58) Field of Classification Search
USPC .......................................... 318/376, 375, 362
See application file for complete search history.

(56) References Cited

U.S. PATENT DOCUMENTS

| | | | | |
|---|---|---|---|---|
| 7,615,947 | B2* | 11/2009 | Tamaoka | ................... H02P 6/24 |
| | | | | 318/362 |
| 9,007,011 | B2* | 4/2015 | Aoki | ......................... H02P 6/24 |
| | | | | 318/703 |
| 9,246,416 | B2* | 1/2016 | Ichikawa | ................... H02P 3/22 |
| 2003/0057906 | A1 | 3/2003 | Kissich et al. | |
| 2013/0307446 | A1 | 11/2013 | Ichikawa | |

FOREIGN PATENT DOCUMENTS

| | | |
|---|---|---|
| JP | 2010-028997 A | 2/2010 |
| JP | 2013-243824 A | 12/2013 |
| JP | 2014-136992 A | 7/2014 |

OTHER PUBLICATIONS

Written Opinion dated Aug. 7, 2018 for corresponding International Application No. PCT/JP2018/022473.
English translation of the Written Opinion dated Aug. 7, 2018 for corresponding International Application No. PCT/JP2018/022473.

* cited by examiner

| OPERATION MODE | POWER SUPPLY | OUTPUT FROM MOTOR BRAKE COMMAND UNIT | D1 | D2 | SW1 | SW2 | SW3 | SW4 SW5 | BRAKE |
|---|---|---|---|---|---|---|---|---|---|
| A | PRESENT | NO-BRAKE COMMAND SIGNAL (HIGH SIGNAL) | ON | OFF | ON | OFF | OFF | OFF | ABSENT |
| B | | BRAKE COMMAND SIGNAL (LOW SIGNAL) | ON | ON | OFF | ON | ON | ON | PRESENT |
| C | ABSENT | | OFF | OFF | OFF | ON | ON | ON | PRESENT |

MOTOR DRIVING CONTROL APPARATUS AND MOTOR DRIVING CONTROL METHOD

FIELD

The present invention relates to a motor driving control apparatus and a motor driving control method.

BACKGROUND

When a three-phase brushless motor is operated for the purpose of the use as a fan motor, for example, conventionally having been in general use is a technology for short-circuiting coils of the motor by electrically short-circuiting a driving bridge circuit, during a period from when a command for braking the rotation is received, or from when the power supply stops, to when the rotation stops. By short-circuiting the motor coils, and short-circuiting the counter electromotive force generated between the motor coils, the rotation of the motor can be stopped quickly with the use of regenerative braking.

At that time, for a system for short-circuiting the coils to operate, some supply of power is required to short-circuit the motor coils. Therefore, when a braking operation is to be performed at the time of power shut-down, for example, the braking time varies depending on residual charge in the power line. Furthermore, such a system lacks a function for suppressing the rotation caused by a windmill phenomenon (forcible rotation of vanes caused by an external wind), which occurs when there is no power supply.

Conventionally having been known, as a solution to the issues described above, is a brake device that ensures that the braking is in effect after the power supply stops, and that stops the motor as quickly as possible.

Available as an example of a brake device for an electric motor is a device that includes a short circuit provided to a power supply path of the electric motor, and that forces the electric motor to stop by dynamic braking (see Patent Literature 1, for example). The short circuit includes a static induction transistor that is conductive without any voltage, and that short-circuits the short circuit.

Another example of the brake device is a dynamic brake for a motor, the dynamic brake including, in a motor driving circuit that controls driving of the motor using a switching element, for example, a rectifier circuit and an energy consuming unit that is connected to the rectifier circuit (see Patent Literature 2, for example). In the brake device, when the switching element is switched off, the rectifier circuit rectifies a counter electromotive force generated in the power line of the motor, and the energy consuming unit consumes the counter electromotive force rectified by the rectifier circuit, so that the motor is stopped.

Also available is a power supply interruption control circuit for an electric motor, the power supply interruption control circuit including a rectifier circuit that is connected to electromagnetic coils of the electric motor, and a switch circuit (see Patent Literature 3, for example). The switch circuit in the power supply interruption control circuit forms a closed circuit, together with the electromagnetic coils and the rectifier circuit, and is not conductive while the power is being supplied to the electric motor, and conductive when an interruption occurs in the power supply.

CITATION LIST

Patent Literature

Patent Literature 1: Japanese Laid-open Patent Publication No. H1-133583

Patent Literature 2: Japanese Laid-open Patent Publication No. H1-209973

Patent Literature 3: Japanese Laid-open Patent Publication No. 2010-28997

SUMMARY

Technical Problem

These conventional brake devices for an electric motor use a switching element that is implemented as a photocoupler, and requires a floating circuit structure, to control the conductive condition of the static induction transistor. These devices also require a battery to allow the static induction transistor to function. Furthermore, to perform dynamic braking, it is assumed, as a precondition, that the control circuit operates by receiving some power supply even at the time when supply of power from the power source for driving the motor is interrupted.

Furthermore, in order for the conventional dynamic brake devices described above to switch ON the transistor for applying the dynamic braking in case of a blackout or an emergency, the dynamic brake devices need to have a floating circuit structure that uses a photocoupler.

Furthermore, the power supply interruption control circuit described above requires a full-wave rectifier circuit connected to the bridge circuit. This circuit also requires a floating circuit structure including an optical isolator to enable a motor to function as a dynamic brake when supply of power is interrupted.

In the manner described above, none of the conventional brake devices described above can be said to have a simple circuit structure. Furthermore, the conventional brake devices have a structure that requires an external signal or power source for braking, and, from the practical point of view, have shortcomings such as an increase in price.

The present invention is made in consideration of the above, and an object of the present invention is to provide a motor driving control apparatus and a motor driving control method capable of implementing completely independent not-powered braking using a simple circuit structure.

Solution to Problem

It is an object of the present invention to at least partially solve the problems in the conventional technology. A motor driving control apparatus according to an embodiment includes a motor driving unit that selectively energizes three-phase coils of a motor, a motor control unit that switches an energizing phase of the coils, the energizing phase being a phase to which the motor driving unit energizes, in a predetermined order by outputting a driving control signal to the motor driving unit, a brake control unit that outputs a brake control signal, an interphase short-circuiting unit that is connected between the coils, and that short-circuits the coil in response to a short-circuiting signal, and a short-circuiting signal output unit that is connected between the interphase short-circuiting unit and one-phase coil that is not different from each of the two-phase coils of the three-phase coils, and that outputs a short-circuiting signal to the interphase short-circuiting unit when the brake control signal is received.

Advantageous Effects of Invention

According to one aspect of the present invention, completely independent not-powered braking can be achieved using a simple circuit structure.

DESCRIPTION OF EMBODIMENTS

A motor driving control apparatus and a motor driving control method according to an embodiment will now be explained with reference to some drawings.

Embodiment

Figure 1:
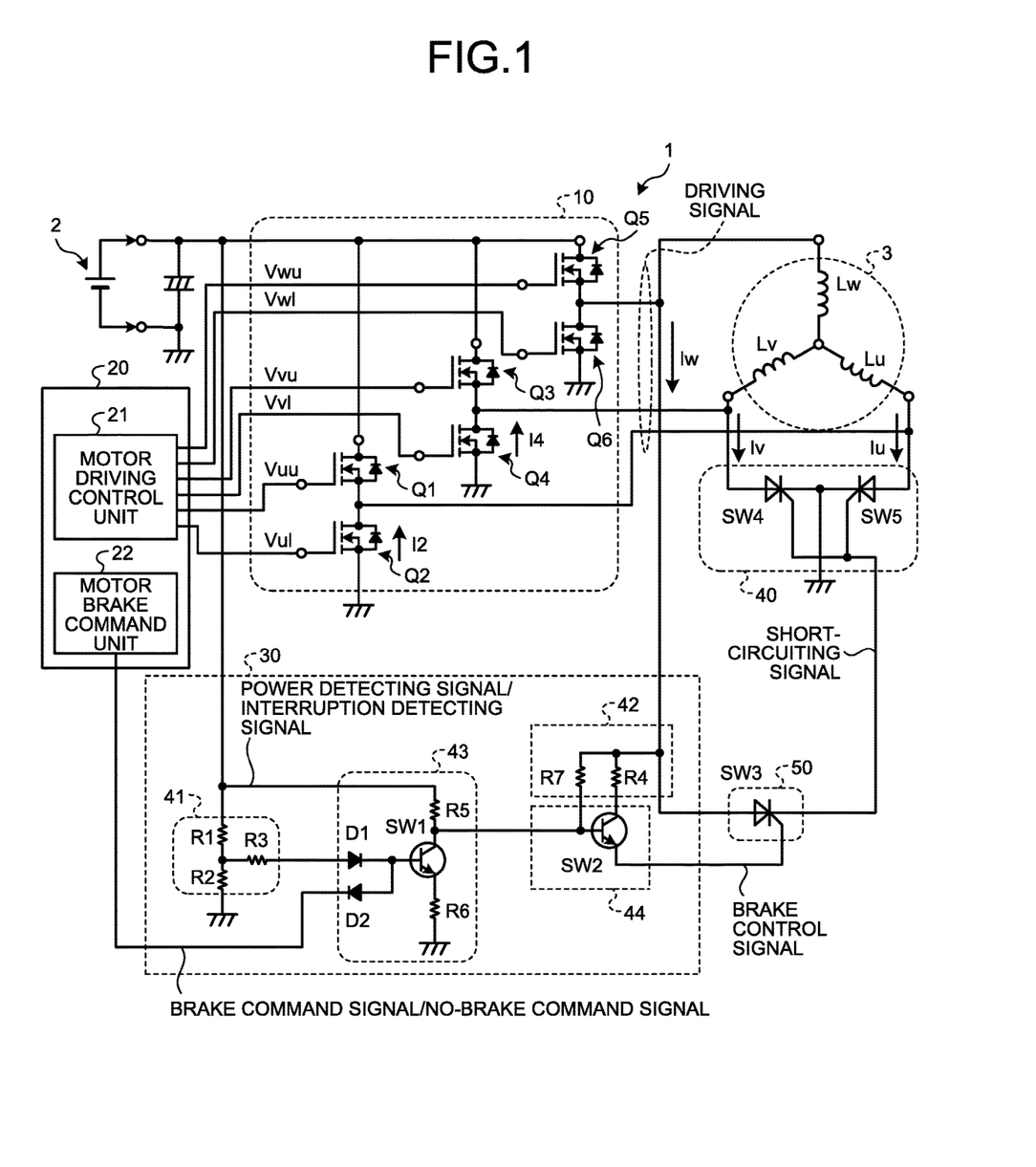
FIG. 1 is a block diagram illustrating an example of a circuit structure of a motor driving control apparatus according to an embodiment.

FIG. 1 is a block diagram illustrating an example of a circuit structure of a motor driving control apparatus according to an embodiment.

As illustrated in FIG. 1, this motor driving control apparatus 1 according to the embodiment includes a motor driving unit 10, a motor control unit 20, a brake control unit 30, an interphase short-circuiting unit 40, and a short-circuiting signal output unit 50. The elements included in the motor driving control apparatus 1 illustrated in FIG. 1 are only a part of the whole, and the motor driving control apparatus 1 may also include any elements other than those illustrated in FIG. 1.

The motor driving control apparatus 1 may be an integrated circuit (IC) device in which the entire motor driving control apparatus 1 is packaged, or a part of the motor driving control apparatus 1 may be packaged in one integrated circuit device. It is also possible for the whole or a part of the motor driving control apparatus 1 to be packaged with another apparatus, in one integrated circuit device.

The motor driving unit 10 selectively energizes three-phase coils Lu, Lv, Lw of a motor 3. The motor control unit 20 switches an energizing phase of the three-phase coils Lu, Lv, Lw, the energizing phase being a phase to which the motor driving unit 10 energizes, by outputting a driving control signal to the motor driving unit 10.

The brake control unit 30 outputs a brake control signal. The interphase short-circuiting unit 40 is connected between two phases of the three-phase coils Lu, Lv, Lw (between the coils Lu and Lv in FIG. 1), and short-circuits the two-phase coils Lu, Lv based on a short-circuiting signal. The short-circuiting signal output unit 50 is connected between the interphase short-circuiting unit 40 and the one-phase coil Lw, which is different from each of the two-phase coils Lu, Lv, among the three-phase coils Lu, Lv, Lw, and outputs a short-circuiting signal to the interphase short-circuiting unit 40 upon receiving a brake control signal.

As described above, the motor driving control apparatus 1 according to the embodiment includes: the motor driving unit 10 that selectively energizes the three-phase coils Lu, Lv, Lw of the motor 3; the motor control unit 20 that switches the energizing phase of the three-phase coils Lu, Lv, Lw, the energizing phase being a phase to which the motor driving unit 10 energizes, in a predetermined order, by outputting a driving control signal to the motor driving unit 10; the brake control unit 30 that outputs a brake control signal; the interphase short-circuiting unit 40 that is connected between the two-phase coils Lu, Lv of the three-phase coils Lu, Lv, Lw, and that short-circuits the two-phase coils Lu, Lv in response to a short-circuiting signal; and the short-circuiting signal output unit 50 that is connected between the interphase short-circuiting unit 40 and the one-phase coil Lw that is different from each of the two-phase coils Lu, Lv of the three-phase coils Lu, Lv, Lw, and that outputs the short-circuiting signal to the interphase short-circuiting unit 40 by receiving an input of the brake control signal. In the motor driving control method according to the embodiment, the motor driving unit 10 is caused to selectively energize the three-phase coils Lu, Lv, Lw of the motor 3; the motor control unit 20 is caused to switch the energizing phase of the three-phase coils Lu, Lv, Lw, the energizing phase being a phase to which the motor driving unit 10 energizes, in a predetermined order by outputting a driving control signal to the motor driving unit 10; the brake control unit 30 is caused to output a brake control signal; the interphase short-circuiting unit 40 connected between the two-phase coils Lu, Lv of the three-phase coils Lu, Lv, Lw is caused to short-circuit the two-phase coils Lu, Lv in response to a short-circuiting signal; and the short-circuiting signal output unit 50 connected between the interphase short-circuiting unit 40 and the one-phase coil Lw that is different from each of the two-phase coils Lu, Lv of the three-phase coils Lu, Lv, Lw is caused to output a short-circuiting signal to the interphase short-circuiting unit 40 when the brake control signal is received.

With this configuration, the motor driving control apparatus 1 can brake the rotation of the motor 3 using a simple structure without requiring a floating circuit structure. Furthermore, because the short-circuiting signal output unit 50 in the motor driving control apparatus 1 can output the short-circuiting signal using the counter electromotive force generated in the one-phase coil Lw, the motor driving control apparatus 1 can achieve completely independent not-powered braking.

The motor driving control apparatus 1 according to the embodiment will now be explained in detail. The motor driving control apparatus 1 is configured to drive the motor 3 with sine-wave driving, for example. The motor driving control apparatus 1 also brakes the rotation of the motor 3.

In this embodiment, the motor 3 is a three-phase brushless motor, for example, and is a fan motor for rotating a fan not illustrated, for example. The motor driving control apparatus 1 rotates the motor 3 by applying driving current with a sine waveform to the coils Lu, Lv, Lw on an armature of the motor 3. The motor driving control apparatus 1 also brakes the rotation of the motor 3 when it is determined to stop the rotation of the motor 3, or when an interruption occurs in the power supply from a power source 2.

The motor driving unit 10 is an inverter circuit that outputs a driving signal to the motor 3, based on the driving control signal received from the motor control unit 20, and that energizes the coils Lu, Lv, Lw on the armature of the motor 3. The motor driving unit 10 includes pairs of two switching elements in a serial circuit, on both sides of the power source 2 (a pair of switching elements Q1, Q2, a pair of switching elements Q3, Q4, and a pair of switching elements Q5, Q6), with the pairs provided correspondingly to the coils Lu, Lv, Lw of the respective phases (the U phase, the V phase, and the W phase), for example. In this embodiment, the switching elements Q1 to Q6 are metal-oxide-semiconductor field-effect transistors (MOSFETs). In each pair of the two switching elements, the connection point between the switching elements serves as an output end, and the output end is connected to a terminal that is connected to the corresponding coil Lu, Lv, Lw of the corresponding phase of the motor 3. Specifically, the connection point between the switching elements Q1, Q2 serves as an output end that is connected to the terminal of the U-phase coil Lu. The connection point between the switching elements Q3, Q4 serves as an output end that is connected to the terminal of the V-phase coil Lv. The connection point between the switching elements Q5, Q6 serves as an output end that is connected to the terminal of the W-phase coil Lw.

The motor control unit 20 is provided as a micro-computer, for example, and controls the units included in the motor driving control apparatus 1. The motor control unit 20 includes a motor driving control unit 21 and a motor brake command unit 22.

The motor driving control unit 21 generates a driving control signal for driving the motor driving unit 10, and outputs the driving control signal to the motor driving unit 10. Examples of the driving control signal generated thereby include, for example, driving control signals Vuu, Vul, Vvu, Vvl, Vwu, and Vwl, corresponding to the switching elements Q1 to Q6, respectively, included in the motor driving unit 10. Specifically, the driving control signal Vuu is output to the switching element Q1, and the driving control signal Vul is output to the switching element Q2. The driving control signal Vvu is output to the switching element Q3, and the driving control signal Vvl is output to the switching element Q4. The driving control signal Vwu is output to the switching element Q5, and the driving control signal Vwl is output to the switching element Q6. These outputs of the driving control signals cause the switching elements Q1 to Q6 corresponding thereto to perform ON and OFF operations, so that the driving signals are output to the motor 3 and the power is supplied to the coils Lu, Lv, Lw of the corresponding phases of the motor 3. When the rotation of the motor 3 are to be stopped, the switching elements Q1 to Q6 are all switched to OFF. For example, when the motor brake command unit 22 outputs a brake command signal for braking the rotation of the motor 3, the motor driving control unit 21 switches all of the switching elements Q1 to Q6 to OFF.

The motor brake command unit 22 generates a brake command signal for causing the brake control unit 30 to brake the rotation of the motor 3, and outputs the brake command signal to the brake control unit 30. When brake is to be applied to slow the rotation of the motor 3 down, the motor brake command unit 22 generates a brake command signal that is a Low signal, for example, and, when brake is not to be applied to slow the rotation of the motor 3 down, the motor brake command unit 22 generates a no-brake command signal that is a High signal, for example. It is also possible for the generated brake command signal to be the High signal, and for the no-brake command signal to be the Low signal.

The brake control unit 30 outputs the brake control signal to the short-circuiting signal output unit 50. The brake control signal is a signal that is output to short-circuit the coils Lu, Lv. As will be described later, in response to the output of the brake control signal to the short-circuiting signal output unit 50, the short-circuiting signal output unit 50 is caused to output a short-circuiting signal to the interphase short-circuiting unit 40, and the interphase short-circuiting unit 40 short-circuits the coils Lu, Lv.

The brake control unit 30 outputs a brake control signal in response to an output of a brake command signal, for braking the rotation of the motor 3, from the motor brake command unit 22, or in response to an interruption of the power supply from the power source 2.

For example, the motor brake command unit 22 outputs a brake command signal when the motor driving control unit 21 stops driving the motor 3. Even when the motor driving control unit 21 stops driving the motor 3, the motor 3 is kept being rotated by inertia. Therefore, to quickly stop the inertial rotation, the motor brake command unit 22 outputs a brake command signal.

When the motor brake command unit 22 outputs a brake command signal, the brake control unit 30 is caused to detect a counter electromotive force generated by the motor 3 being rotated by inertia, and to output a brake control signal using the detected counter electromotive force.

When an interruption occurs in the power supply from the power source 2 while the motor 3 is being driven in rotation, the motor driving unit 10 stops outputting the driving signal, but the motor 3 is kept being rotated by inertia. Therefore, to quickly stop the inertial rotation, the brake control unit 30 is caused to detect the counter electromotive force, and to output the brake control signal using the detected counter electromotive force.

The counter electromotive force is also generated in the coils Lu, Lv, Lw when an external force causes the motor 3 to rotate, e.g., when the fan is rotated by an external wind while the motor 3 is not rotating and power supply from the power source 2 is interrupted. To suppress the rotation of the motor 3 by an external force, the brake control unit 30 brakes the rotation of the motor 3 by detecting an interruption of the power supply and a counter electromotive force generated by an external force, and by outputting a brake control signal using the detected counter electromotive force.

The brake control unit 30 includes a power supply interruption detecting circuit 41, a counter electromotive force detecting circuit 42, a first brake control circuit 43, and a second brake control circuit 44. Although details thereof will be described later, the brake control unit 30 outputs a brake control signal when the power supply interruption detecting circuit 41 detects an interruption of the power supply while the motor driving unit 10 is driving the motor 3. The brake control unit 30 also outputs a brake control signal when the power supply interruption detecting circuit 41 detects an interruption in the power supply, and generation of a counter electromotive force in the coil Lw (an example of a one-phase coil) is detected while the motor driving unit 10 is not driving the motor 3.

The power supply interruption detecting circuit 41 detects an interruption in the power supply from the power source 2. The power supply interruption detecting circuit 41 includes resistor elements R1, R2 in a serial circuit connected in parallel with the power source 2, and a resistor element R3 that is disposed between the serial circuit and the first brake control circuit 43. A source voltage of the power source 2 is divided based on the resistance value of the resistor elements R1, R2. The power supply interruption detecting circuit 41 outputs a power detecting signal (High signal) that is based on the divided voltage, to the first brake control circuit 43. When there is an interruption in the power supply from the power source 2, the source voltage drops to zero. In response, the power supply interruption detecting circuit 41 outputs an interruption detecting signal (Low signal) indicating that there is an interruption in the power supply.

The first brake control circuit 43 switches between braking on the motor 3 and no braking on the motor 3 in response to the detection result of an interruption of the power supply from the power source 2, being detected by the power supply interruption detecting circuit 41, or to a brake command signal or a no-brake command signal received from the motor brake command unit 22.

The first brake control circuit 43 includes a switching element SW1, and a first diode element D1 and a second diode element D2. In this embodiment, the switching element SW1 is a transistor, and one end of the switching element SW1 is connected to the power source 2 via a resistor element R5, and the other end is grounded via a resistor element R6. The one end of the switching element SW1 is also connected to the second brake control circuit 44. The anode of the first diode element D1 is connected to the power supply interruption detecting circuit 41, and the cathode is connected to the control terminal of the switching element SW1. The anode of the second diode element D2 is connected to the control terminal of the switching element SW1, and the cathode is connected to the motor brake command unit 22.

For example, when there is no interruption in the power source 2 and the power supply interruption detecting circuit 41 is outputting a power detecting signal (High signal), the first diode element D1 is kept ON. At this time, if the motor brake command unit 22 is outputting a no-brake command signal (High signal) for not braking the rotation of the motor 3, the second diode element D2 is kept OFF. Therefore, the power detecting signal is input to the control terminal of the switching element SW1 via the first diode element D1, and keeps the switching element SW1 to ON.

By contrast, even while the power supply interruption detecting circuit 41 is outputting the power detecting signal, if the motor brake command unit 22 outputs a brake command signal for braking the rotation of the motor 3 (Low signal), the second diode element D2 is switched ON, and the power detecting signal flows into the second diode element D2. Therefore, the power detecting signal is not input to the control terminal of the switching element SW1, and the switching element SW1 is switched OFF.

When the power supply interruption detecting circuit 41 outputs an interruption detecting signal (Low signal), no current is flowing into the first diode element D1, regardless of what the output of the motor brake command unit 22 is, so that no current is input to the control terminal of the switching element SW1. Therefore, the switching element SW1 is switched OFF.

Although details will be described later, when the switching element SW1 in the first brake control circuit 43 is OFF, the second brake control circuit 44 outputs the brake control signal based on the detection result from the counter electromotive force detecting circuit 42. On the other hand, when the switching element SW1 in the first brake control circuit 43 is ON, the second brake control circuit 44 does not output a brake control signal regardless of what the detection result from the counter electromotive force detecting circuit 42 is. By switching ON/OFF the switching element SW1, the first brake control circuit 43 controls the output from the second brake control circuit 44, and switches between braking on the motor 3 and no braking on the motor 3.

The counter electromotive force detecting circuit 42 detects a counter electromotive force generated in the coil Lw. The counter electromotive force detecting circuit 42 includes a resistor element R4 and a resistor element R7. When a counter electromotive force is generated in the coil Lw, current Iw flows into the coil Lw. As the current Iw flows into the resistor element R4 in the counter electromotive force detecting circuit 42, a voltage is generated between the ends of the resistor element R4, at a level corresponding to the level of the current Iw and the resistance value of the resistor element R4, and the voltage is applied to the collector of the switching element SW2. The voltage is also applied to the control terminal of the switching element SW2 via the resistor element R7. This serves as an operation for detecting a counter electromotive force, and, as a result, the switching element SW2 is switched ON.

When a counter electromotive force is generated in the coil Lw while the first brake control circuit 43 is switching from no braking on the motor 3 to braking on the motor 3, the second brake control circuit 44 outputs a brake control signal using the generated counter electromotive force. The second brake control circuit 44 includes the switching element SW2.

In this embodiment, the switching element SW2 is a transistor, and is provided between the counter electromotive force detecting circuit 42 and the short-circuiting signal output unit 50. The control terminal of the switching element SW2 is connected to the first brake control circuit 43, and is connected to the coil Lw via the resistor element R7.

Let us assume now that the counter electromotive force detecting circuit 42 detects a counter electromotive force generated in the coil Lw while the switching element SW1 in the first brake control circuit 43 is OFF, that is, while there is no supply of power from the power source 2, or when the motor brake command unit 22 is outputting a brake command signal. In such a case, the current Iw flowing the coil Lw flows into the switching element SW2, and switches the switching element SW2 ON. This causes a brake control signal to be output from the second brake control circuit 44 to the short-circuiting signal output unit 50.

By contrast, when the switching element SW1 in the first brake control circuit 43 is ON, that is, when the power is being supplied from the power source 2, and the motor brake command unit 22 is outputting a no-brake command signal, even if the counter electromotive force detecting circuit 42 detects a counter electromotive force generated in the coil Lw, the current flowing the coil Lw flows into the switching element SW1 in the first brake control circuit 43 via the second brake control circuit 44. Therefore, the current Iw is not input to the control terminal of the switching element SW2, and the switching element SW2 remains OFF. Therefore, no brake control signal is output from the second brake control circuit 44 to the short-circuiting signal output unit 50.

The short-circuiting signal output unit 50 is connected between the interphase short-circuiting unit 40 and the coil Lw. The short-circuiting signal output unit 50 outputs a short-circuiting signal to the interphase short-circuiting unit 40 when a brake control signal is input to the second brake control circuit 44. The short-circuiting signal output unit 50 includes a switching element SW3. In this embodiment, the switching element SW3 is a thyristor. The anode of the thyristor is connected to the coil Lw, the cathode is connected to the interphase short-circuiting unit 40, and the gate is connected to the second brake control circuit 44.

The brake control signal output from the second brake control circuit 44 is input to the gate of the switching element SW3. This causes the switching element SW3 to switch ON, and the current Iw flowing the coil Lw is output to the interphase short-circuiting unit 40 as a short-circuiting signal.

The interphase short-circuiting unit 40 is connected between the coils Lu, Lv, and short-circuits the coils Lu, Lv in response to a short-circuiting signal. The interphase short-circuiting unit 40 includes two switching elements SW4, SW5 provided on both ends of the coils Lu, Lv. In this embodiment, the switching elements SW4, SW5 are thyristors. The anodes of the switching elements SW4, SW5 are connected to the coils Lv, Lu, respectively, and the cathodes are grounded. The gates of the switching elements SW4, SW5 are connected to the short-circuiting signal output unit 50 (specifically, to the cathode of the switching element SW3), and a short-circuiting signal is input thereto. When a short-circuiting signal is input, the switching elements SW4, SW5 are switched ON, and short-circuits between the coils Lu, Lv. Because the cathodes of the switching elements SW4, SW5 are connected to the switching elements Q2, Q4 in the motor driving unit 10 via the ground, short-circuited current from the switching elements SW4, SW5 flows into the parasitic diodes of the switching elements Q2, Q4 (I2, I4 in FIG. 1). In other words, when the short-circuiting signal output unit 50 short-circuits the coils Lu, Lv (an example of two-phase coils), the parasitic diode in each of the switching elements Q2, Q4 in the motor driving unit 10 operates as a part of a regenerative circuit. In this manner, the switching elements Q2, Q4 in the motor driving unit 10 can be used as a regenerative channel for the flowing short-circuited current I2, I4.

Furthermore, by using the two thyristors in the interphase short-circuiting unit 40, a function as a rectifier circuit and a function as a short circuit can be implemented simultaneously, so that the structure of the interphase short-circuiting unit 40 can be simplified. Furthermore, the interphase short-circuiting unit 40 can be achieved using a highly versatile component such as a thyristor, as disclosed in the embodiment.

Figure 2:
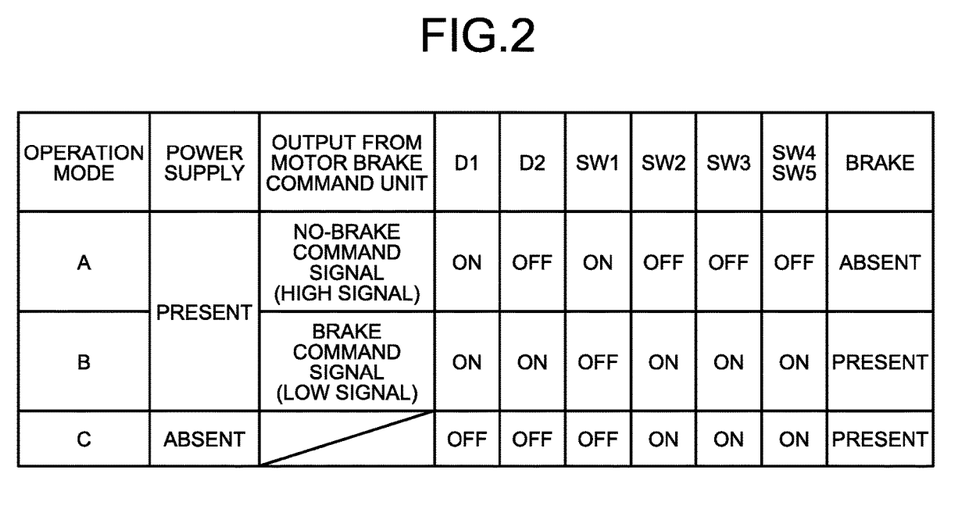
FIG. 2 is a schematic diagram for explaining operation modes of the motor driving control apparatus according to the embodiment.

Operation modes of braking operations performed by the motor driving control apparatus 1 will now be explained with reference to FIGS. 1 and 2. FIG. 2 is a schematic diagram for explaining operation modes of the motor driving control apparatus 1 according to the embodiment. As described above, the motor driving control apparatus 1 brakes the rotation of the motor 3 when an interruption occurs in the power supply from the power source 2, or when the motor brake command unit 22 outputs a brake command signal. The braking-related operations performed by the motor driving control apparatus 1 are classified into those in three operation modes A to C, as illustrated in FIG. 2.

To begin with, when the motor control unit 20 rotates the motor 3 without braking (operation modes A), as illustrated in FIG. 2, the motor driving control apparatus 1 is receiving the power supply from the power source 2, and a no-brake command signal (High signal) is being output from the motor brake command unit 22. In such a case, the first diode element D1 is switched ON, and the second diode element D2 is switched OFF in the first brake control circuit 43, so that the switching element SW1 is switched ON. In this configuration, even if counter electromotive force is generated in the motor 3, the switching elements SW2 to SW5 all remain OFF, so that neither a brake control signal nor a short-circuiting signal is output, and therefore, no braking operation is performed by the motor driving control apparatus 1 (no braking).

Let us now assume that, for example, the motor control unit 20 determines to stop the rotation of the motor 3, thereby causing the motor driving control unit 21 to stop driving the motor 3, and causing the motor brake command unit 22 to apply brake to the motor 3 (operation modes B). In such a case, the motor driving control apparatus 1 is receiving the power supply from the power source 2, and a brake command signal (Low signal) is output from the motor brake command unit 22. In such a case, both of the first diode element D1 and the second diode element D2 are switched ON, and the switching element SW1 is switched OFF. At this time, as a counter electromotive force is generated in the motor 3, the switching elements SW2 to SW5 are switched ON, and a brake control signal and a short-circuiting signal are generated using the counter electromotive force generated in the motor 3. With this configuration, the interphase short-circuiting unit 40 short-circuits the coils Lu, Lv, and brakes the rotation of the motor 3 (braking).

In the manner described above, when the motor control unit 20 stops driving the motor 3 in rotation, the motor driving control apparatus 1 can brake the rotation of the motor 3 using the counter electromotive force generated in the motor 3 by inertia.

When an interruption occurs in the power supply from the power source 2 to the motor driving control apparatus 1, and the power supply stops (operation modes C), the first diode element D1 and the second diode element D2 are both switched OFF, and the switching element SW1 is switched OFF. At this time, as the counter electromotive force is generated in the motor 3, the switching elements SW2 to SW5 are switched ON, and a brake control signal and a short-circuiting signal are generated using a counter electromotive force generated in the motor 3. In this manner, the interphase short-circuiting unit 40 is short-circuited, and brakes the rotation of the motor 3 (braking).

In the operation modes C, the motor driving control apparatus 1 brakes the rotation of the motor 3 when an interruption occurs in the power supply from the power source 2, regardless of whether the motor control unit 20 is driving or not driving the motor 3 in rotation. In other words, the motor driving control apparatus 1 brakes the rotation of the motor 3 when an interruption occurs in the power supply from the power source 2, regardless of whether the signal output from the motor brake command unit 22 that was output immediately before the interruption of the power supply is a no-brake command signal or a brake command signal.

Therefore, the motor driving control apparatus 1 can apply brake to the motor 3 being rotated by an external force, when an interruption occurs in the power supply while the motor 3 is not being driven in rotation, for example. In this manner, when the motor 3 is a fan motor, and is installed in a user system, for example, a countermeasure for rotation of the motor, being forced to rotate by an external wind, can be implemented.

In the manner described above, the motor driving control apparatus 1 can brake the rotation of the motor 3, and stop the rotation of the motor 3 more quickly when an interruption occurs in the power supply from the power source 2. Furthermore, because the motor driving control apparatus 1 brakes the rotation using the counter electromotive force generated in the motor 3, a completely independent not-powered braking operation can be achieved, without providing a battery that is separate from the power source 2, even when there is no power supply from the power source 2. Furthermore, because the motor driving control apparatus 1 is responsible for detecting an interruption of the power supply and outputting a brake command signal, it is not necessary to provide a separate external device for detecting the interruption of the power supply and outputting the brake command signal, and it is possible to implement an independent braking system using the motor driving control apparatus 1.

Figure 3:
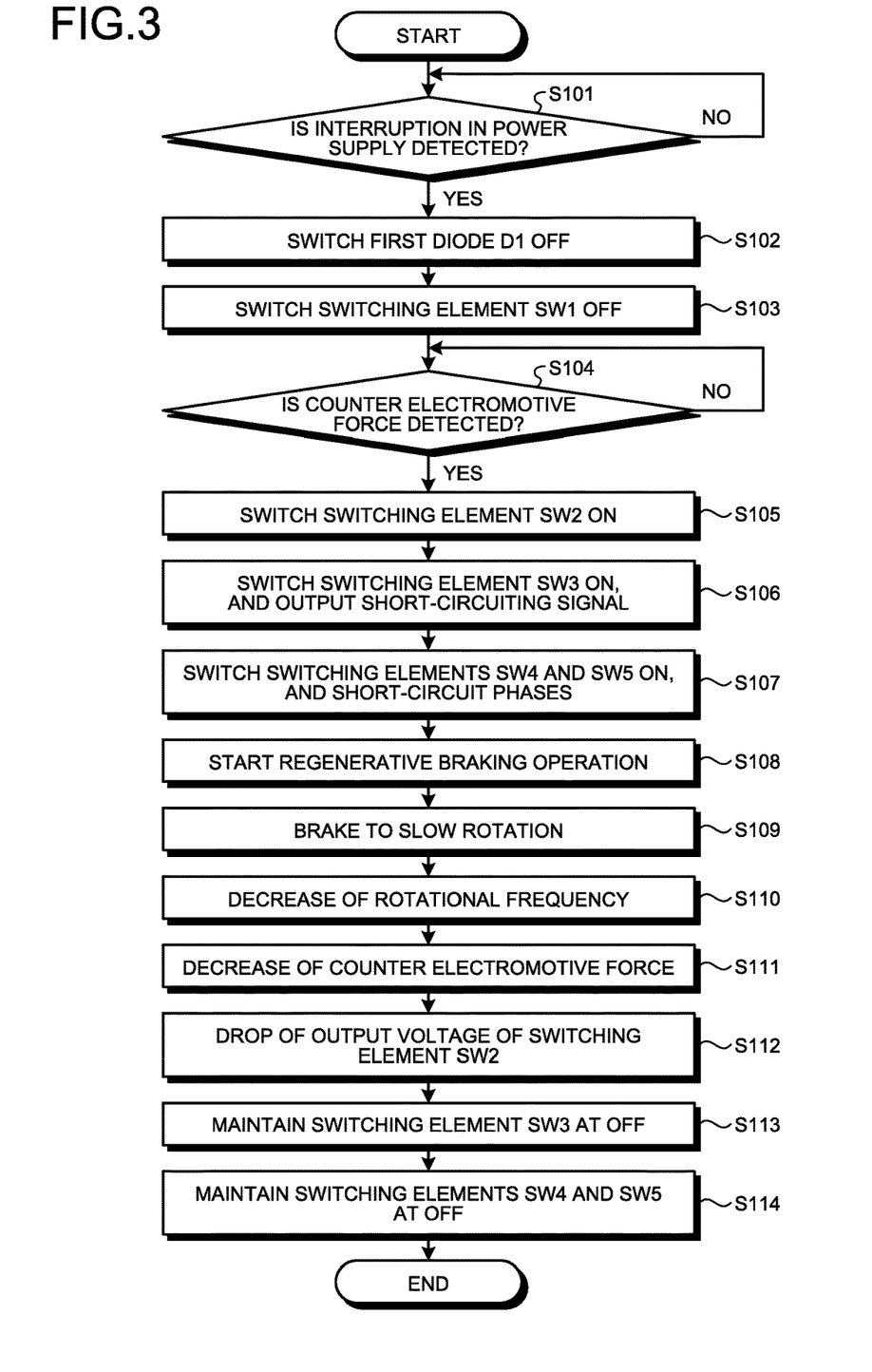
FIG. 3 is a first flowchart for explaining an example of an operation sequence of the motor driving control apparatus according to the embodiment.
Figure 4:
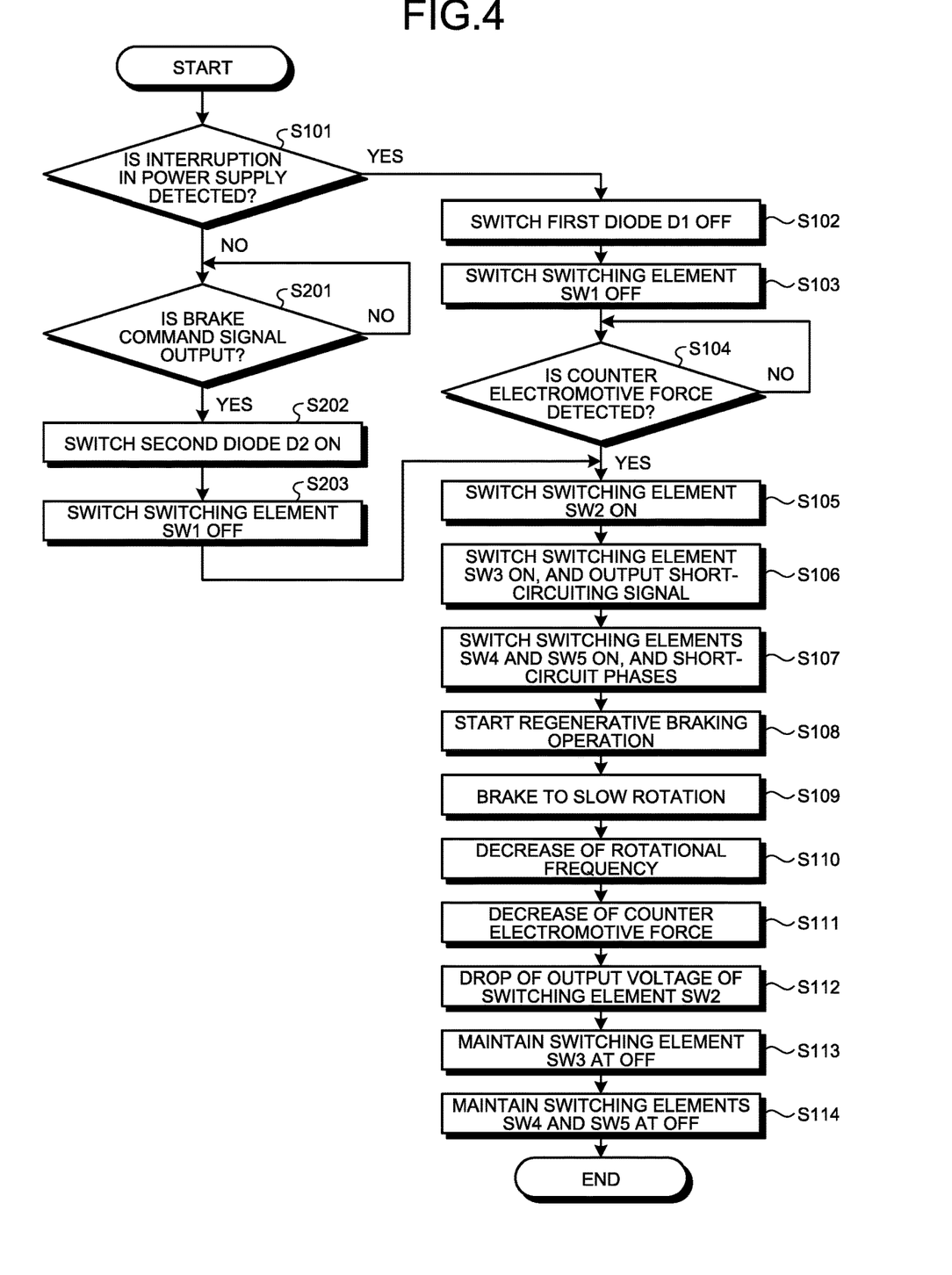
FIG. 4 is a second flowchart for explaining an example of the operation sequence of the motor driving control apparatus according to the embodiment.
Figure 5:
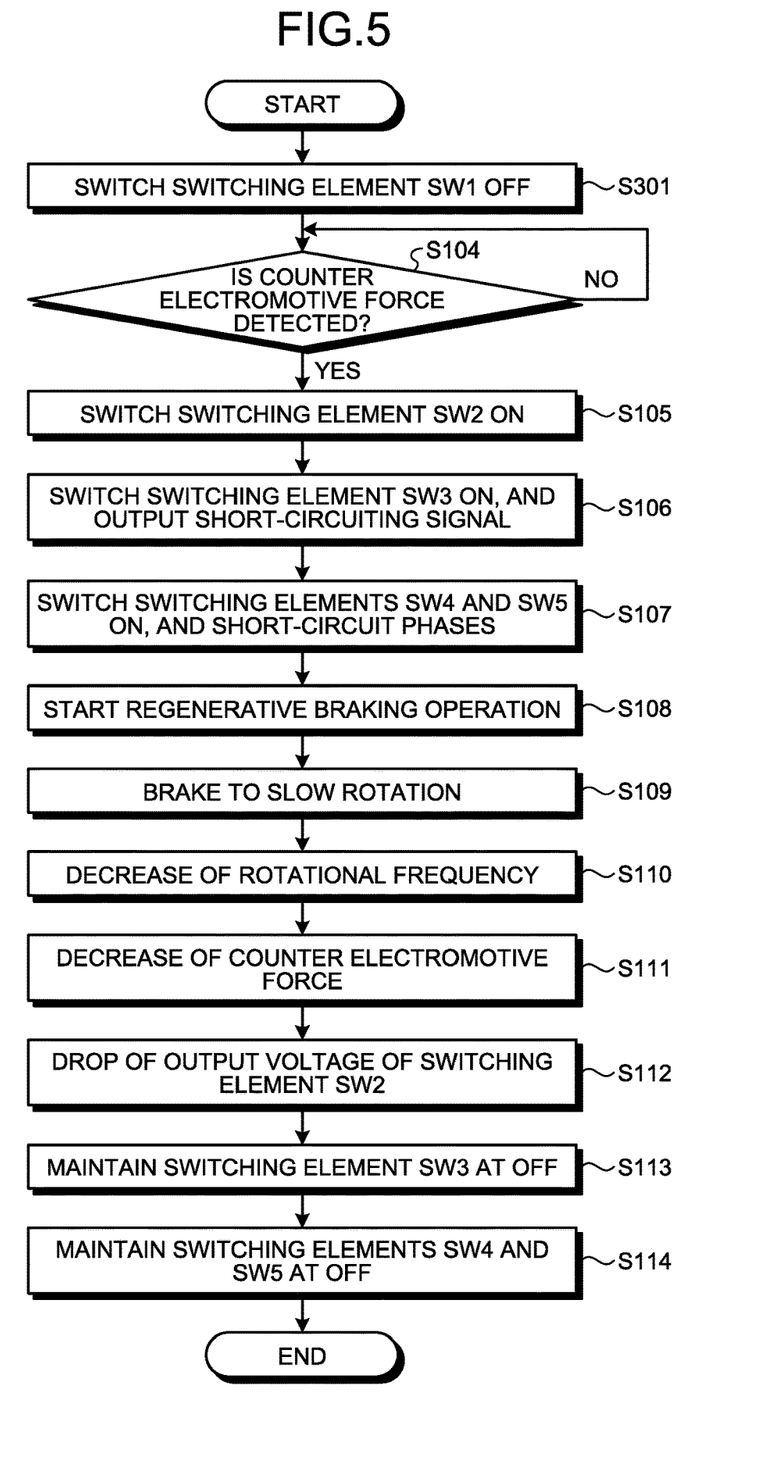
FIG. 5 is a third flowchart for explaining an example of the operation sequence of the motor driving control apparatus according to the embodiment.

The sequence of operations performed by the motor driving control apparatus 1 will now be explained with reference to FIGS. 3 to 5. FIGS. 3 to 5 are flowcharts for explaining some examples of the sequence of operations performed by the motor driving control apparatus 1. Explained now with reference to FIG. 3 is an operation of the motor driving control apparatus 1 when an interruption occurs in the power supply from the power source 2 while the motor driving control apparatus 1 is driving the motor 3 in rotation.

As illustrated in FIG. 3, if the power supply interruption detecting circuit 41 in the motor driving control apparatus 1 remains without detecting any interruption in the power supply (No at Step S101), the power supply interruption detecting circuit 41 keeps detecting an interruption in the power supply at Step S101.

If the power supply interruption detecting circuit 41 detects an interruption in the power supply (Yes at Step S101), the first diode element D1 in the first brake control circuit 43 is switched OFF (Step S102), and the switching element SW1 is switched OFF (Step S103).

If the counter electromotive force detecting circuit 42 remains without detecting any counter electromotive force (No at Step S104), the counter electromotive force detecting circuit 42 keeps detecting a counter electromotive force at Step S104.

If the counter electromotive force detecting circuit 42 detects a counter electromotive force in the coil Lw (Yes at Step S104), the switching element SW2 in the second brake control circuit 44 is switched ON, and causes a brake control signal to be output (Step S105). As a result, the switching element SW3 in the short-circuiting signal output unit 50 is switched ON, and causes a short-circuiting signal to be output (Step S106). When the short-circuiting signal is input to the interphase short-circuiting unit 40, the switching elements SW4, SW5 in the interphase short-circuiting unit 40 are switched ON, and causes the coils Lu, Lv (the two-phase coils) to be short-circuited (Step S107).

As a result, the short-circuited current I2, I4 flows through the regenerative channel including the parasitic diodes of the switching elements Q2, Q4 in the motor driving unit 10, and the motor driving control apparatus 1 starts a regenerative braking operation (Step S108) and brakes to slow the rotation of the motor 3 down (Step S109). As a result, the rotating frequency of the motor 3 decreases (Step S110), and the counter electromotive force generated in the motor 3 also decreases (Step S111). Therefore, the output voltage of the switching element SW2 also drops (Step S112), and causes the switching element SW3 to be maintained at OFF (Step S113), and the switching elements SW4, SW5 to be maintained at OFF (Step S114).

Explained now with reference to FIG. 4 is an operation in which the motor driving control apparatus 1 brakes the motor 3, with the power being supplied from the power source 2, while the motor driving control apparatus 1 is not driving the motor 3 in rotation. The operations that are the same as those illustrated in FIG. 3 will be given the same reference signs, and explanations thereof will be omitted.

As illustrated in FIG. 4, while the power supply interruption detecting circuit 41 in the motor driving control apparatus 1 is not detecting any interruption in the power supply from the power source 2 (No at Step S101) and the motor brake command unit 22 is not outputting a brake command signal (No at Step S201), the first brake control circuit 43 continues the process at Step S201, and waits for an input of a brake command signal. If a brake command signal is output (Yes at Step S201), the second diode element D2 in the first brake control circuit 43 is switched ON (Step S202), and the switching element SW1 is switched OFF (Step S203). At the subsequent steps, the motor driving control apparatus 1 brakes the rotation of the motor 3, and the rotation of the motor 3 are slowed down, in the same manner as illustrated in FIG. 3.

Explained now with reference to FIG. 5 is an operation of the motor driving control apparatus 1 performed when the motor 3 is forced to rotate by an external force while the motor driving control apparatus 1 is not driving the motor 3 in rotation and the motor 3 is not rotating, or while there is no supply of power from the power source 2. In other words, explained now is an operation of the motor driving control apparatus 1 performed when the motor 3 not rotating is forced to rotate by an external force such as external wind.

In such a case, because the motor brake command unit 22 is outputting a brake command signal, or the power supply interruption detecting circuit 41 is detecting an interruption in the power supply, the switching element SW1 is OFF, as illustrated in FIG. 5 (Step S301). If the counter electromotive force detecting circuit 42 then detects a counter electromotive force at Step S104, the motor driving control apparatus 1 brakes the rotation of the motor 3, by performing the same operations as those at Step S105 and thereafter in FIG. 3.

Figure 6:
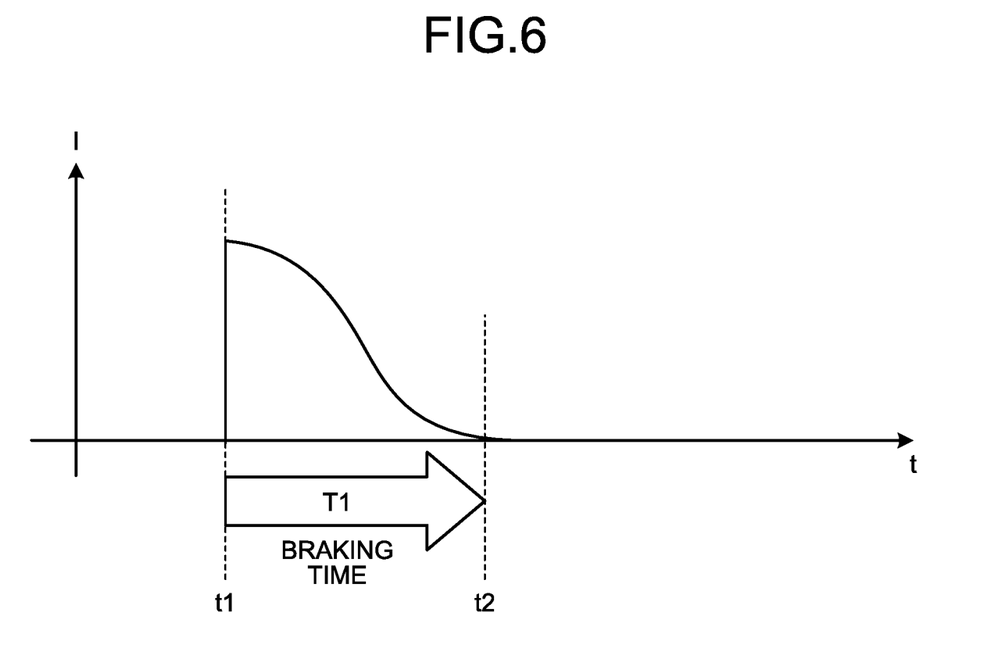
FIG. 6 is a first schematic diagram for explaining effects of a braking operation of the motor driving control apparatus according to the embodiment.
Figure 7:
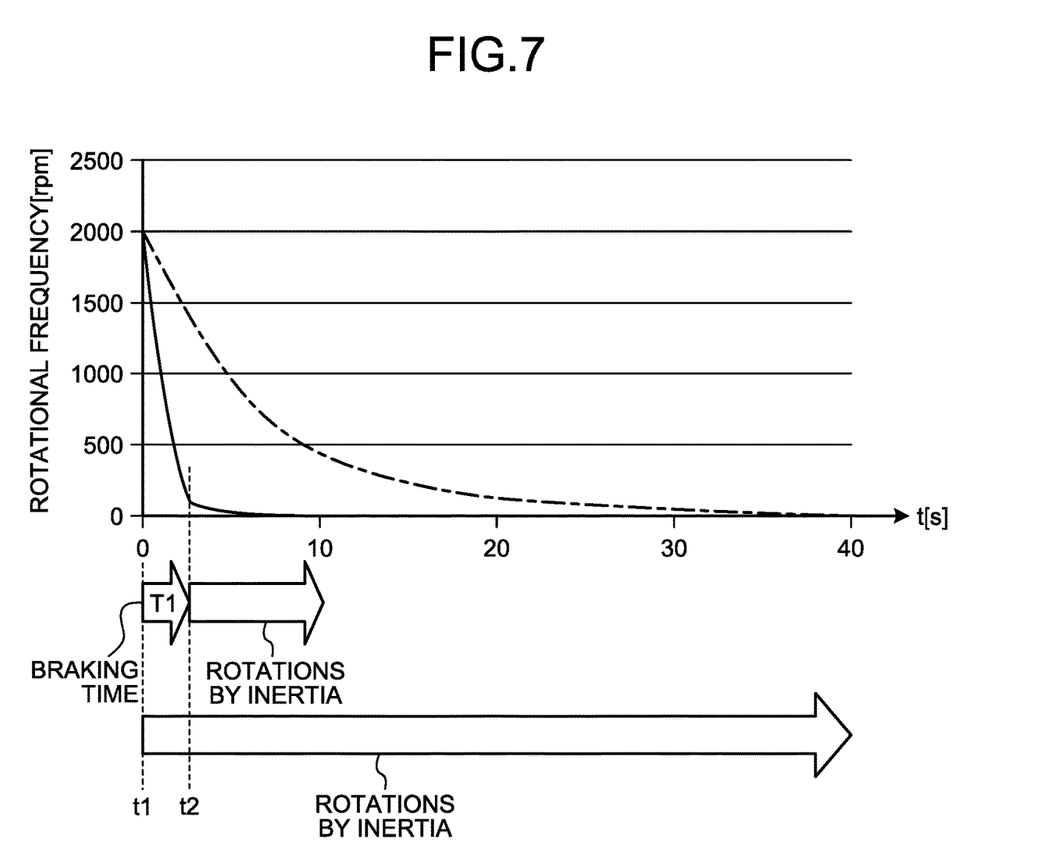
FIG. 7 is a second schematic diagram for explaining the effects of the braking operation of the motor driving control apparatus according to the embodiment.
Figure 8:
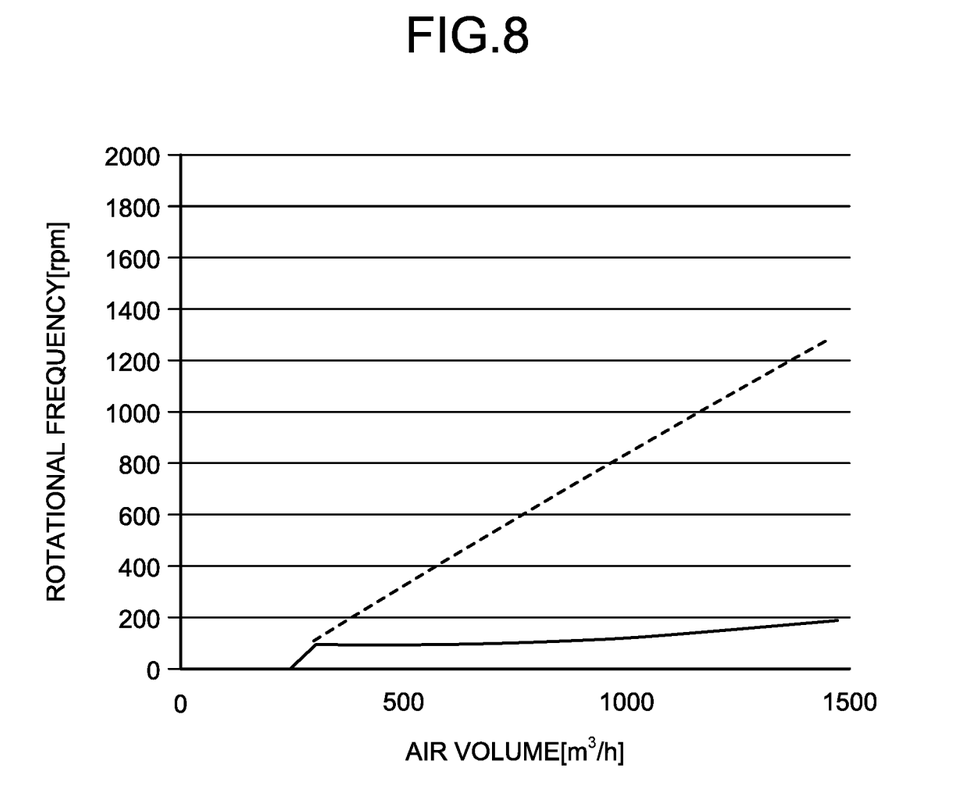
FIG. 8 is a third schematic diagram for explaining the effects of the braking operation of the motor driving control apparatus according to the embodiment.

Effects achieved by the braking operation of the motor driving control apparatus 1 will now be explained with reference to FIGS. 6 to 8. FIGS. 6 to 8 are schematic diagrams for explaining the effects of the braking operation performed by the motor driving control apparatus 1.

Explained with reference to FIGS. 6 and 7 is an example where an interruption occurs in the power supply from the power source 2 while the motor driving control apparatus 1 is driving the motor 3 in rotation.

As illustrated in FIG. 6, once an interruption of the power supply from the power source 2 occurs at time t1, a counter electromotive force is generated by the motor 3 being rotated by inertia, and the interphase short-circuiting unit 40 short-circuits the coils Lu, Lv. As a result, at a time subsequent to the time t1, the short-circuited current Iv and Iu, as illustrated in FIG. 1, flows into the interphase short-circuiting unit 40, as indicated by a solid line in FIG. 6, and then drops to an almost zero at time t2. This is because the rotating frequency of the motor 3 decreases, and the counter electromotive force decreases. In such a case, T1 between time t1 and time t2 corresponds to the braking time.

After the interruption of the power supply from the power source 2 occurs at the time t1, if the motor driving control apparatus 1 does not apply the brake, as indicated by the long dashed short dashed line in FIG. 7, the motor 3 is kept being rotated by inertia, and stops rotating in 40 seconds from t1, for example. In FIG. 7, the time elapsed from when the interruption of the power supply has occurred is plotted to the horizontal axis. Therefore, zero on the horizontal axis in FIG. 7 corresponds to the time t1.

By contrast, when the motor driving control apparatus 1 performs the braking operation, as indicated by the solid line in FIG. 7, braking is applied to the motor 3 during the period T1, starting from the time t1. As a result, by the time t2, the rotating frequency of the motor 3 decreases sharply. In accordance with decrease of the rotating frequency of the motor 3, the counter electromotive force generated in the motor 3 also decreases, so that the motor driving control apparatus 1 ceases to perform the braking operation. The motor 3 still keeps being rotated by inertia, but because the rotating frequency is low, the motor 3 stops rotating in 10 seconds from the time t1, for example.

In the manner described above, by enabling the motor driving control apparatus 1 to perform the braking operation when an interruption occurs in the power supply, it is possible to reduce the time required for the motor 3 to stop, compared with when no braking is applied.

The elapsed time illustrated in FIG. 7 is merely an example, and is not limited to the time illustrated in FIG. 7. The time required for the motor 3 to stop varies depending on the rotating frequency or the number of windings of the motor 3, the impellor shape, or the like.

Explained now with reference to FIG. 8 is a specific example of the braking effects achieved when an external wind hits the fan while the motor 3 is not rotating, and applies an external force to the motor 3.

The horizontal axis in FIG. 8 represents the air volume of the external wind, and the vertical axis represents the rotating frequency of the motor 3. As indicated by a dashed line in FIG. 8, without the braking operation performed by the motor driving control apparatus 1, the rotating frequency of the motor 3 increases as the air volume of the external wind increases.

By contrast, as indicated by the solid line in FIG. 8, with the braking operation of the motor driving control apparatus 1, even when the air volume of the external wind increases, an increase in the rotating frequency of the motor 3 can be suppressed dramatically. In this manner, by enabling the motor driving control apparatus 1 to perform the braking operation while the motor 3 is not driven in rotation, the rotation of the motor 3, that is, the rotation of the fan can be suppressed even when the external wind is strong.

In this embodiment, with the braking function described above, because the energy of the counter electromotive force generated in the coil Lw is used as the power source for the braking operation, a completely independent not-powered operation can be achieved without requiring a separate power source such as a battery. In particular, it is possible to stop the rotation of the motor 3 reliably when an interruption occurs in the power supply from the power source 2, and the brake control unit 30 can perform the braking operation even while the motor 3 is not driven by the motor control unit 20 in rotation. Furthermore, with the braking function described above, it is possible to suppress the rotation of the motor 3, being forced to rotate by an external wind, for example, when the motor 3 is installed in a user system as a fan motor, and to use the braking function as a countermeasure for a backflow in the fan motor (forcible rotation by a backflow wind). Furthermore, because the interphase short-circuiting unit 40 is configured to implement a function as a rectifier circuit and a function as a short circuit simultaneously, the structure of the components required in short-circuiting the coils Lu, Lv (braking) can be simplified, and highly versatile components can be used to achieve the structure. Furthermore, the parasitic diodes in the switching elements Q2, Q4 (MOSFETs) in the motor driving unit 10 can be used (shared) as a part of the regenerative channel for the short-circuited current, so that the circuit forming the regenerative channel for the short-circuited current can be simplified. Furthermore, the pattern layout on the printed board can be shared between the motor driving unit 10 and the short-circuited current regenerative channel, so that the motor driving control apparatus 1 can be reduced in size.

In this embodiment, no mechanical relay or switch is required to implement the braking function described above, and it is possible to improve the reliability of the motor driving control apparatus 1 and to extend the product lifetime.

The configuration of each of the units included in the motor driving control apparatus 1 and that of the motor according to the embodiment are not limited to the example illustrated in FIG. 1.

Illustrated in FIG. 1 is an example of the motor 3 in which the coils Lu, Lv, Lw has a star connection, but the connection may also be a delta connection.

Figure 9:
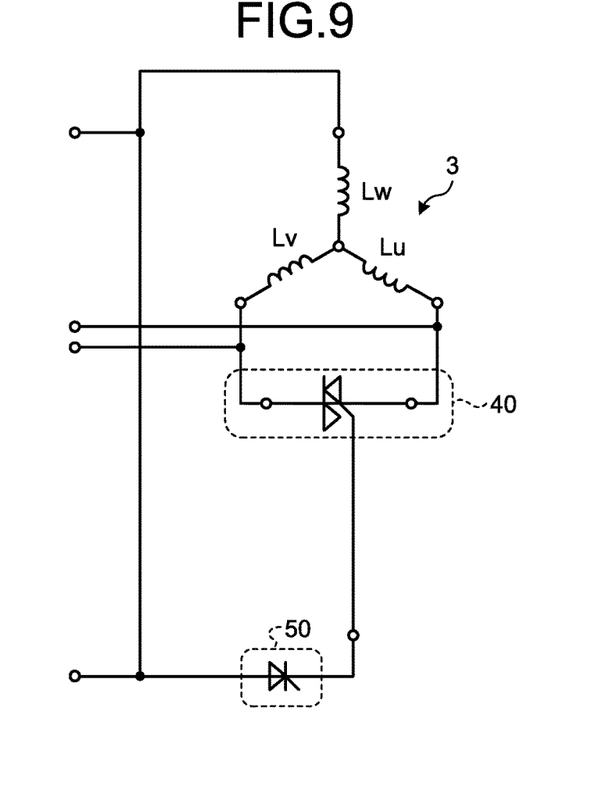
FIG. 9 is a schematic diagram illustrating a modification of an interphase short-circuiting unit according to the embodiment.

Furthermore, the two switching elements SW4, SW5 in the interphase short-circuiting unit 40 are provided as thyristors in FIG. 1, but the embodiment is not limited thereto. For example, the interphase short-circuiting unit 40 may be implemented as one TRIAC (triode for alternating current). In such a case, as illustrated in FIG. 9, the TRIAC is disposed between the coils Lu, Lv. Furthermore, a short-circuiting signal from the short-circuiting signal output unit 50 is input to the gate of the TRIAC. In such a case, the interphase short-circuiting unit 40 does not need to be grounded, and it is not necessary to use the parasitic diodes of the switching elements Q2, Q4 in the motor driving unit 10 as a regenerative channel.

FIG. 9 is a schematic diagram illustrating the modification of the interphase short-circuiting unit 40. In FIG. 9, elements of the motor driving control apparatus 1 not required in explanations are not illustrated.

Figure 10:
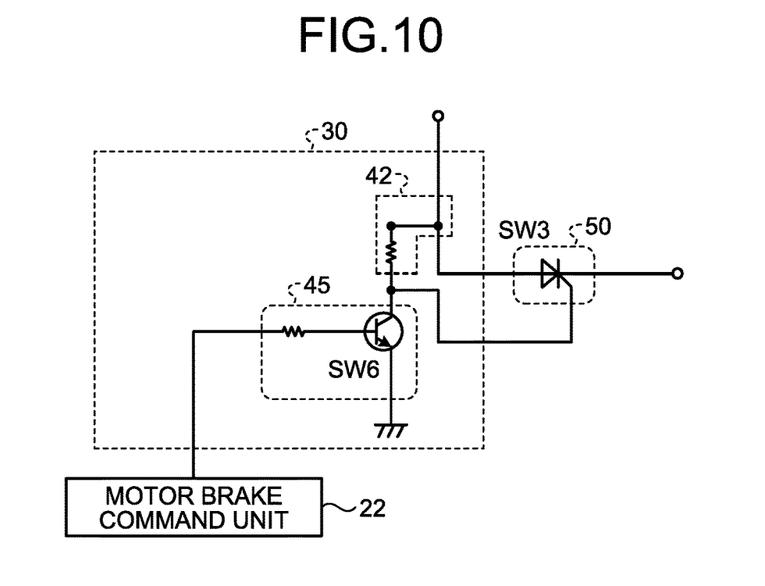
FIG. 10 is a schematic diagram illustrating a modification of a brake control unit according to the embodiment.

In the motor driving control apparatus 1 described above in the embodiment, the brake control unit 30 is configured to detect an interruption in the power from the power source 2, but the embodiment is not limited thereto. For example, it is also possible to configure the motor control unit 20 to detect an interruption in the power supply. In such a case, as illustrated in FIG. 10, the motor driving control apparatus 1 includes a third brake control circuit 45, instead of each of the power supply interruption detecting circuit 41, the first brake control circuit 43 and the second brake control circuit 44. As will be described below, the third brake control circuit 45 receives the brake command signal output from the motor brake command unit 22, and, when the counter electromotive force detecting circuit 42 detects a counter electromotive force, outputs a brake control signal using the counter electromotive force.

FIG. 10 is a schematic diagram illustrating the modification of the brake control unit 30. In FIG. 10, elements of the motor driving control apparatus 1 not required in explanations are not illustrated.

As illustrated in FIG. 10, the third brake control circuit 45 includes a switching element SW6. The switching element SW6 is a transistor, for example, and is disposed between the counter electromotive force detecting circuit 42 and the ground. A no-brake command signal or a brake command signal from the motor brake command unit 22 is input to the control terminal of switching element SW6.

When the motor 3 is to be driven in rotation, the motor brake command unit 22 outputs a no-brake command signal (High signal). As a result, the switching element SW6 in the third brake control circuit 45 is switched ON, and, because the current Iw flowing into the coil Lw goes into the ground via the switch SW6 even if the counter electromotive force detecting circuit 42 detects a counter electromotive force, the third brake control circuit 45 does not outputting a brake control signal.

By contrast, when the rotation of the motor 3 are to be stopped, e.g., when an interruption of the power from the power source 2 is detected, for example, the motor brake command unit 22 outputs a brake command signal (Low signal). As a result, the switching element SW6 in the third brake control circuit 45 is switched OFF. If the counter electromotive force detecting circuit 42 detects a counter electromotive force in this configuration, the current Iw flowing into the coil Lw does not go into the switching element SW6, and the third brake control circuit 45 outputs the brake control signal to the short-circuiting signal output unit 50.

In the manner described above, by enabling the motor control unit 20 to detect an interruption of the power supply from the power source 2, the circuit structure of the brake control unit 30 can be simplified.

The configurations of the units included in the motor driving control apparatus 1 according to the embodiment are not limited to those illustrated in FIGS. 1, 9, and 10 explained above. For example, the whole or a part of the brake control unit 30 may be implemented using either hardware or software.

Furthermore, in the embodiment described above, the interphase short-circuiting unit 40 is explained to be connected between the coils Lu, Lv, and to short-circuit the two-phase coils, but the embodiment is not limited thereto, and the interphase short-circuiting unit 40 may be configured to be connected between the coils Lv, Lw or between the coils Lw, Lv, and short-circuit the two-phase coils.

Furthermore, it is also possible to configure to drive the motor control unit 20 with a power source other than the power source 2. In such a case, the motor control unit 20 may be implemented as an IC that is separate from the IC on which the motor driving control apparatus 1 is mounted, for example. By configuring to drive the motor control unit 20 with a power source other than the power source 2, the motor control unit 20 is allowed to output a brake command signal even when there is no power supply from the power source 2.

Furthermore, in the embodiment described above, the motor control unit 20 is explained to determine whether to apply brake to the motor 3, but the embodiment is not limited thereto. For example, it is also possible to control the motor driving control apparatus 1 in such a manner that an external device other than the motor control unit 20 applies brake to the motor 3 when a user presses an emergency stop button. In such a case, a terminal for receiving a brake command from the external device is provided to the first brake control circuit 43. As a result, for example, the motor 3 can be forced to stop quickly when it is necessary to stop the motor 3 in case of an emergency.

Furthermore, the short-circuiting signal output unit 50 is not limited to the configuration described in the embodiment. The short-circuiting signal output unit 50 may include a component other than the thyristor as an element. For example, the short-circuiting signal output unit 50 may be implemented using a mechanical switch (e.g., a mechanical contact relay). In such a case, it is preferable to use a design taking a long-term reliability into consideration, with a countermeasure for defective contact, for example.

The operations of the motor driving control apparatus 1 according to the embodiment are not limited to those explained with reference to FIGS. 3 to 5. The operations may also include operations other than those illustrated in FIGS. 3 to 5, or the operations illustrated in FIGS. 3 to 5 may be partly performed in parallel.

Furthermore, the embodiment described above is not intended to limit the scope of the present invention in any way. Configurations including some combinations of the elements, being combined as appropriate, still fall within the scope of the present invention. Furthermore, it is possible for those skilled in the art to come up with any other additional effects and modifications easily. Therefore, a broader scope of the present invention is not limited to the embodiment described above, and various changes are still possible.

REFERENCE SIGNS LIST 1 motor driving control apparatus
2 power source
3 motor
10 motor driving unit
20 motor control unit
21 motor driving control unit
22 motor brake command unit
30 brake control unit
40 interphase short-circuiting unit
41 power supply interruption detecting circuit
42 counter electromotive force detecting circuit
43 first brake control circuit
44 second brake control circuit
45 third brake control circuit
50 short-circuiting signal output unit
Lu, Lv, Lw coil
Q1 to Q6 switching element
Vuu, Vul, Vvu, Vvl, Vwu, Vwl driving control signal
R1 to R7 resistor element
SW1, SW2, SW6 switching element (transistor)
SW3, SW4, SW5 switching element (thyristor)
D1 first diode element
D2 second diode element
Iw current
I2, I4 short-circuited current

The invention claimed is:

1. A motor driving control apparatus comprising:
a motor driving unit that selectively energizes three-phase coils of a motor;
a motor control unit that switches an energizing phase of the three-phase coils, the energizing phase being a phase to which the motor driving unit energizes, in a predetermined order by outputting a driving control signal to the motor driving unit;
a brake control unit that outputs a brake control signal;
an interphase short-circuiting unit that is connected between two-phase coils of the three-phase coils, and that short-circuits the two-phase coils in response to a short-circuiting signal; and a short-circuiting signal output unit that is connected between the interphase short-circuiting unit and one-phase coil that is different from each of the two-phase coils of the three-phase coils, and that outputs the short-circuiting signal to the interphase short-circuiting unit when the brake control signal is received, wherein the brake control unit comprises a power supply interruption detecting circuit that detects an interruption of power supply from a power source supplying power to the motor, and outputs the brake control signal, while the motor driving unit is driving the motor, when the power supply interruption detecting circuit detects an interruption of the power supply, and outputs the brake control signal, while the motor driving unit is not driving the motor, when the power supply interruption detecting circuit detects an interruption of the power supply and a counter electromotive force generated in the one-phase coil is detected.

2. The motor driving control apparatus according to claim 1, wherein the short-circuiting signal output unit includes a thyristor.

3. The motor driving control apparatus according to claim 1, wherein the interphase short-circuiting unit includes two thyristors.

4. The motor driving control apparatus according to claim 3, wherein the motor driving unit comprises a switching element that has a parasitic diode operating as a part of a regenerative circuit when the short-circuiting signal output unit short-circuits the two-phase coils.

5. The motor driving control apparatus according to claim 1, wherein the interphase short-circuiting unit includes a TRIAC.

6. A motor driving control apparatus comprising:
a motor driving unit that selectively energizes three-phase coils of a motor;
a motor control unit that switches an energizing phase of the three-phase coils, the energizing phase being a phase to which the motor driving unit energizes, in a predetermined order by outputting a driving control signal to the motor driving unit;
a brake control unit that outputs a brake control signal;
an interphase short-circuiting unit that is connected between two-phase coils of the three-phase coils, and that short-circuits the two-phase coils in response to a short-circuiting signal; and
a short-circuiting signal output unit that is connected between the interphase short-circuiting unit and one-phase coil that is different from each of the two-phase coils of the three-phase coils, and that outputs the short-circuiting signal to the interphase short-circuiting unit when the brake control signal is received, wherein
the brake control unit comprises:
a power supply interruption detecting circuit that detects an interruption of power supply from a power source supplying power to the motor;
a counter electromotive force detecting circuit that detects a counter electromotive force generated in the one-phase coil;
a first brake control circuit that switches to apply brake or not to apply brake to the motor based on a detection result of an interruption of the power supply, the detection result being detected by the power supply interruption detecting circuit; and
a second brake control circuit that outputs the brake control signal using the counter electromotive force detected by the counter electromotive force detecting circuit, and the brake control unit outputs the brake control signal when the power supply interruption detecting circuit detects an interruption of the power supply while the motor driving unit is driving the motor.

7. The motor driving control apparatus according to claim 6, wherein the short-circuiting signal output unit includes a thyristor.

8. The motor driving control apparatus according to claim 6, wherein the interphase short-circuiting unit includes two thyristors.

9. The motor driving control apparatus according to claim 8, wherein the motor driving unit comprises a switching element that has a parasitic diode operating as a part of a regenerative circuit when the short-circuiting signal output unit short-circuits the two-phase coils.

10. The motor driving control apparatus according to claim 6, wherein the interphase short-circuiting unit includes a TRIAC.

11. A motor driving control apparatus comprising:
a motor driving unit that selectively energizes three-phase coils of a motor;
a motor control unit that switches an energizing phase of the three-phase coils, the energizing phase being a phase to which the motor driving unit energizes, in a predetermined order by outputting a driving control signal to the motor driving unit;
a brake control unit that outputs a brake control signal;
an interphase short-circuiting unit that is connected between two-phase coils of the three-phase coils, and that short-circuits the two-phase coils in response to a short-circuiting signal; and
a short-circuiting signal output unit that is connected between the interphase short-circuiting unit and one-phase coil that is different from each of the two-phase coils of the three-phase coils, and that outputs the short-circuiting signal to the interphase short-circuiting unit when the brake control signal is received, wherein
the motor control unit outputs a brake command signal for braking rotation of the motor while the motor driving unit is not driving the motor, and
the brake control unit comprises:
a counter electromotive force detecting circuit that detects a counter electromotive force generated in the one-phase coil; and
a third brake control circuit that outputs, when the brake command signal is received and the counter electromotive force detecting circuit detects a counter electromotive force, the brake control signal using the counter electromotive force.

12. The motor driving control apparatus according to claim 11, wherein the short-circuiting signal output unit includes a thyristor.

13. The motor driving control apparatus according to claim 11, wherein the interphase short-circuiting unit includes two thyristors.

14. The motor driving control apparatus according to claim 13, wherein the motor driving unit comprises a switching element that has a parasitic diode operating as a part of a regenerative circuit when the short-circuiting signal output unit short-circuits the two-phase coils.

15. The motor driving control apparatus according to claim 11, wherein the interphase short-circuiting unit includes a TRIAC.

* * * * *